Patented May 31, 1927.

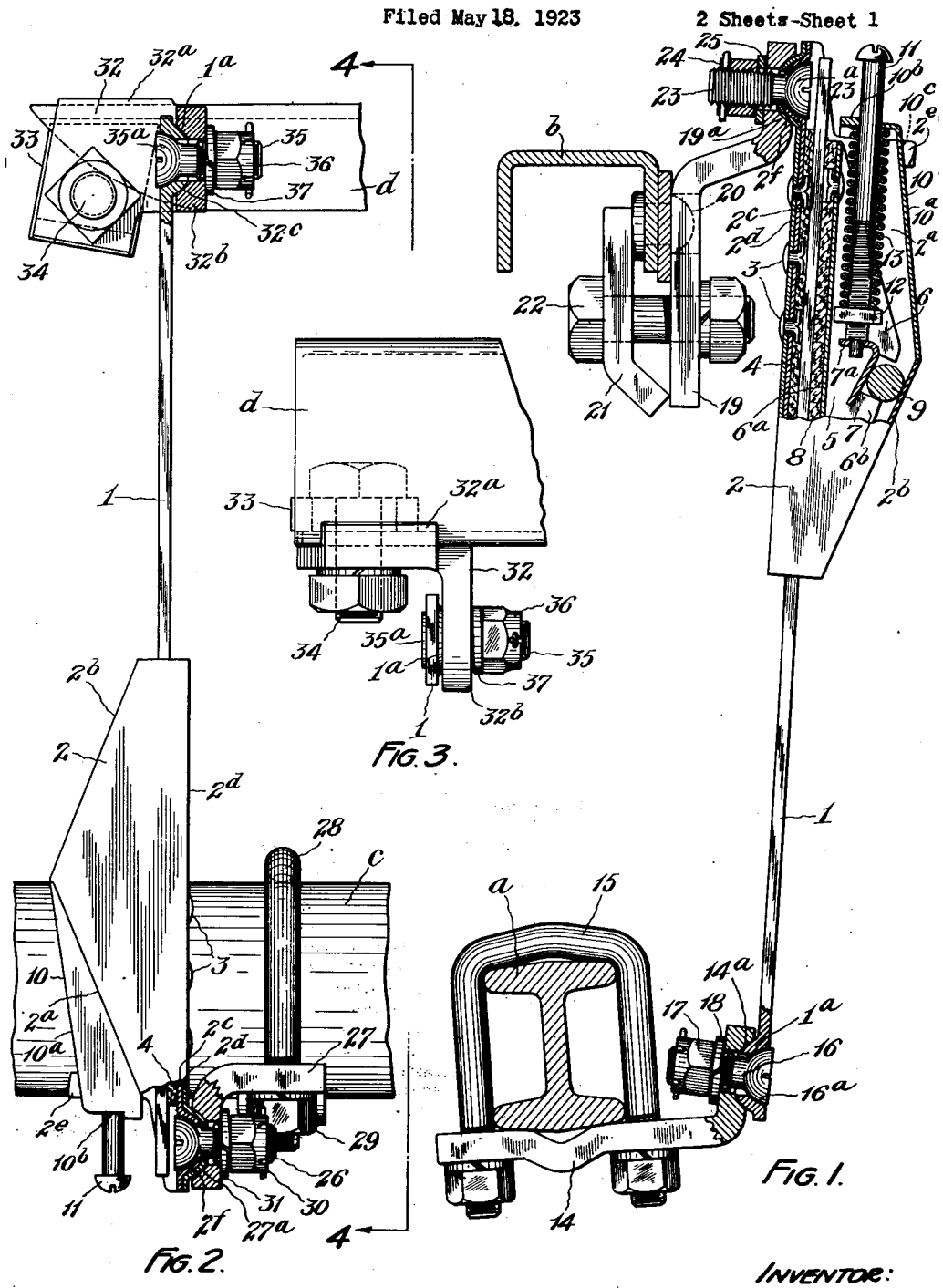

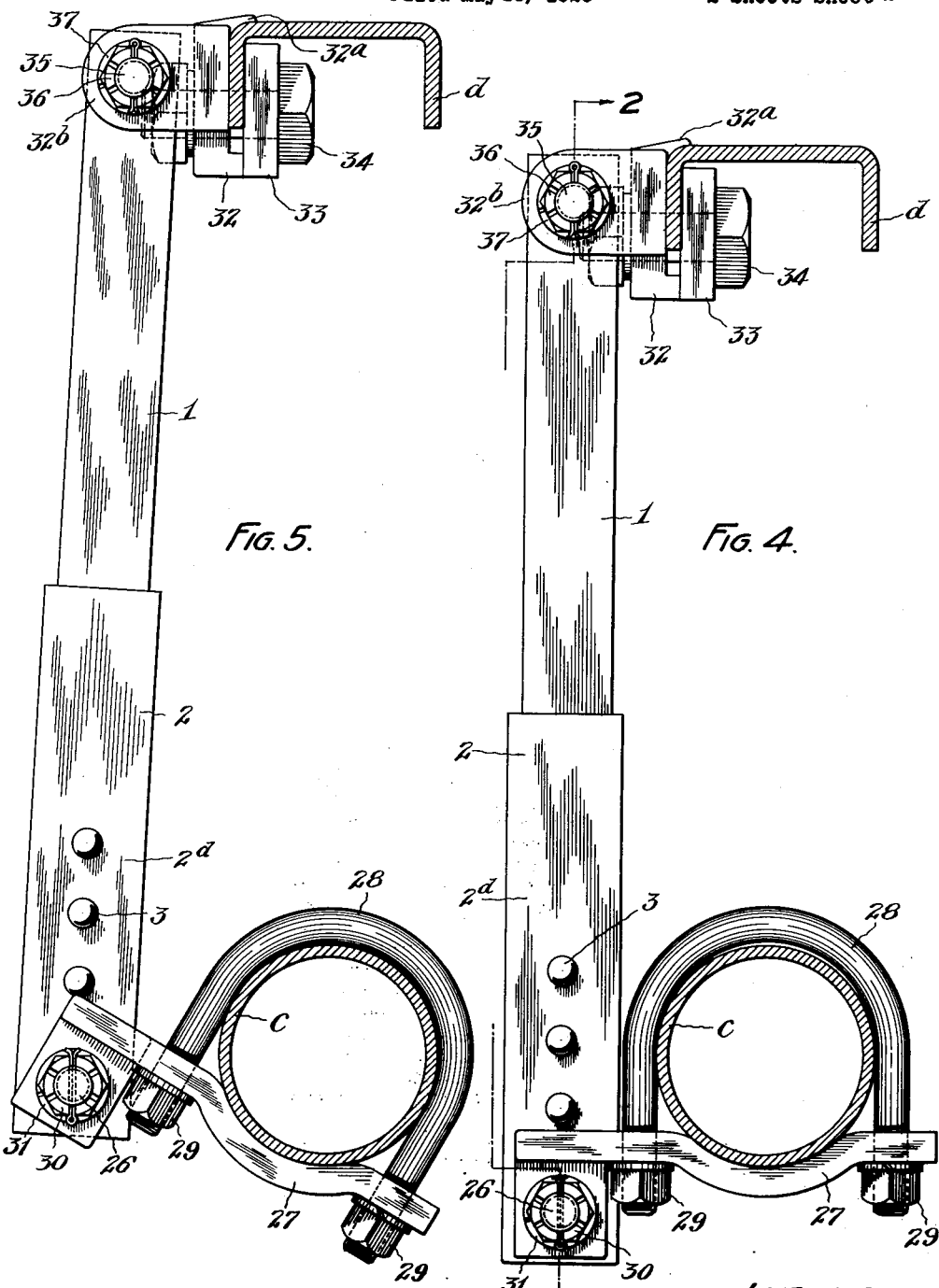

1,631,078

UNITED STATES PATENT OFFICE.

SAMUEL K. WELLMAN, OF CLEVELAND, OHIO.

SHOCK ABSORBER.

Application filed May 18, 1923. Serial No. 639,726.

The invention relates to shock absorbers for motor vehicles and is applicable to shock absorbers of the type shown in U. S. Letters Patent to Andrew Christianson No. 1,156,665, and in my previously filed application for U. S. Letters Patent, Serial No. 580,483. In the accompanying drawings, the improvements constituting the present invention are shown applied to the form of construction disclosed in my said application, Serial No. 580,483, to which reference may be had for a full disclosure of some of the structural details less fully shown herein.

In the case of the shock absorbers illustrated in my said pending application, reliance was placed upon flexibility of some of the metallic parts of the structure to accommodate the necessary relative swaying movements of the vehicle body in relation to the axles. This earlier form of construction has given a very fair degree of satisfaction in this respect but it has been found that in the case of some installations, after long service, repeated straining of the flexible metal parts results in their crystallization and fracture. Accordingly one of the principal objects of the present invention is the provision of a simple and relatively cheap form of coupling for connecting the shock absorber parts to the vehicle body and axles with provision for requisite relative movement of the parts without subjecting the latter to injurious strains of any sort.

Another object of the invention is the mounting of shock absorbers of the character in question in such a manner as to reduce road interference to a minimum.

A further object of the invention is the provision of a readily adjustable mounting device for the shock absorber to accommodate vehicles with differing clearances between the body and axles, as where bodies or loads of different weights are used with vehicle springs of the same size and strength.

Other objects, more or less ancillary or incidental to the foregoing, and the manner of attaining all of the various objects will appear in the following description setting forth in connection with the accompanying drawings a preferred embodiment of the invention as applied to a Ford automobile.

In the drawings,—

Fig. 1 is a side elevation of one of my improved shock absorbers mounted on the front axle and body frame of the vehicle.

Fig. 2 is a rear elevation of the shock absorber mounted on the rear axle and body frame of the vehicle.

Fig. 3 is a plan view of the upper part of the structure, shown in Fig. 2.

Fig. 4 is a side elevation of the rear shock absorber, as shown in Fig. 2.

Fig. 5 is a side elevation similar to Fig. 4 but showing the axle attaching device adjusted to accommodate the shock absorber to a vehicle with greater clearance between the body and the axle.

Referring in detail to the construction illustrated, 1 is an elongated friction plate of rolled steel plate which extends slidably through an elongated casing 2. As illustrated, said casing is made of wrought plate or sheet metal, the main part or body of the casing being punched in a single piece from the sheet and then bent into the finished form shown. The casing is larger at one end than the other, has both of its ends open and has also a lateral opening $2^a$ extending from points intermediate its ends to its open, larger end. From the opening $2^a$ to the smaller end of the casing is a wall $2^b$ which is inclined longitudinally towards the opposite wall of the casing which latter wall is formed by the two overlapping sides $2^c$, $2^d$ of the sheet metal blank.

The casing 2 when bent into its finished form requires little to secure it in that form but I provide for this purpose a plurality of rivets 3, 3 which extend through the overlapping sides $2^c$, $2^d$ of the casing and serve also to secure in the casing a friction facing 4, the rivets having their inner ends split so that they are adapted to be bent over and clinched into the facing 4 with a substantial countersink, as indicated in Fig. 1. The friction facing 4 can be of any suitable material and construction in so far as the present invention is concerned but I prefer and have shown it as made of absorbent material impregnated with a substance having a coefficient of friction that is substantially uniform under all service conditions, this material being fully described in my aforesaid pending application.

In the casing 2 is mounted a movable friction member 5, the main part of which is in the form of a sheet metal stamping 6 having a flat side $6^a$ and lateral flanges $6^b$, $6^b$ which are notched to receive and hold a bearing plate 7 which is disposed at an angle to the flat side. The bearing plate 7 is bent to form a spring abutment $7^a$ for a purpose to be presently explained. The flat side 6ª of the friction member has secured to it a friction facing 8 of the same character as the friction facing 4, said faces engaging the opposite sides of the friction plate 1. An anti-friction roller 9 is mounted in notches of the friction member 6, being interposed between the bearing plate 7 and the inclined wall 2ᵇ of the casing.

A cover or cap 10 is provided for the casing and comprises a section 10ª to close the lateral opening 2ª of the casing and a section 10ᵇ to partially close the adjacent open end of said casing. The cap 10 is preferably formed of a single part stamped from sheet metal and bent to the form shown in the drawings. The cap is formed with a pair of slots 10ᶜ which fit over notched lugs 2ᵉ formed on the casing structure 2. The end section 10ᵇ of the cap is formed with an aperture in which is slidably mounted a rod or bolt 11 which has its inner end turned down to provide a swivelling engagement with an aperture in the abutment 7ª of the bearing plate 7. A nut 12 is mounted on the inner threaded end of the bolt 11 and serves as an adjustable abutment thereof for one end of a spiral spring 13 which is mounted on the bolt between said abutment and the inner side of the end section 10ᵇ of the cap 10. The nut 12 is preferably square and is disposed near enough the adjacent face 6ª of the movable friction member so that the latter prevents its rotation on the bolt. By simply turning the bolt the nut 12 can be adjusted on it to vary the tension of the spring 13, said spring serving to press the friction member 5 toward the inclined walls 2ª of the casing and, by reason of the reaction of the latter through the roller 9, to press the friction member 5 against the friction plate 1 and said plate in turn against the friction facing 4. The spring 13, in addition to exerting the pressure referred to on the friction member 5, serves by reaction to hold the cap 10 in position on the casing, though I prefer to supplement the action of the spring by slightly bending over the ends of the lugs 2ᵉ. When assembling the parts, after the friction member 5 and the roller 9 have been inserted in the casing the cap 10 with the bolt 11 and nut 12 and spring 13 attached thereto is placed in position by moving the cap endwise so as to compress the spring enough to permit the notched lugs 2ᵉ to enter the slots 10ᶜ, whereupon the expansion of the spring forces the cap endwise into interlocking engagement with the lugs 2ᵉ.

To operatively secure the above described mechanism to the vehicle axle and frame I have devised improved connecting devices which I will now describe. The connecting devices for the front and rear springs, respectively, of the vehicle differ somewhat and I will first refer to the connections for the front spring. A yoke 14 is secured by means of a U-bolt 15 to the front axle $a$ of the vehicle. This yoke 14 has an apertured upturned end and the aperture is formed with a semi-spherical countersink 14ª. The friction plate 1 has one end formed in a press with an apertured semi-spherical concavo-convex socket 1ª, the outer side of which fits the countersink 14ª. Then a screw bolt 16 with a semi-spherical head 16ª to engage the inner side of the socket 1ª extends through the aperture of said socket and the aperture of the yoke 14 and is adjustably secured by a nut 17 with interposed spring washer 18. A joint is thus provided between the friction plate 1 and the yoke 14 which permits the plate 1 to swing around the axis of the bolt 16 and also to have a limited universal movement about the center of the concentric spherical surfaces. The spring washer 18 is strong enough to hold the spherical surfaces in firm contact and yet insures freedom for the limited movement referred to. Obviously the nut 17 should not be turned down enough to fully compress the spring washer 18, the sole function of said washer being to act as a spring.

In a similar manner, the overlapping side walls 2ᶜ, 2ᵈ of the plate metal casing 2 are at one end of said casing formed with an apertured semi-spherical socket 2ᶠ which co-operates with a clamp secured to the front transverse frame member of the vehicle. This clamp consists of an angle plate 19 perforated or recessed to engage a structural rivet 20 of the vehicle frame $b$, a second angle plate 21 and a bolt 22. The upper end of the angle plate 19 is formed with an aperture having a semi-spherical countersink 19ª which fits the outer side of the socket 2ᶠ and a screw bolt 23 extends through the apertures of said socket and angle iron 19 and has its semi-spherical head 23ª in engagement with the inner side of the socket 2ᶠ, the bolt 23 being secured by a nut 24 with an interposed spring washer 25.

Thus the shock absorber parts are secured both to the frame and the axle of the vehicle by connecting devices providing limited universal movement to the shock absorber devices in relation to the frame and axle, respectively. In this connection it will be obvious that of the two members which engage the respective faces of the concavo-convex sockets formed in the friction plate 1 and the casing 2, either can be rigidly secured to the vehicle axle or frame, as the case may be, though I prefer to so form the member having the countersink which fits the convex side of the socket that said member will serve as part of a clamp to be fixed to the vehicle axle or chassis frame.

While the use of the concavo-convex or spherical form of the connection parts for securing universal movement is highly desirable, it is to be noted that the invention in certain broader aspects is not limited to such spherical form inasmuch as the advantages of the socket and countersink construction are in a measure independent of the spherical form thereof. That is to say, with the socket and countersink construction the shank of the bolt is largely if not wholly relieved of shearing stresses and because of the relatively wide coacting surfaces of the bolt head, socket and countersink it is feasible to have the joint loose enough to afford some universal movement even if the bolt head, socket and countersink be made in some other form, plane (conical) for example, instead of spherical. To secure such result it is desirable, of course, that the joint be adjustable, as by nut 17, and it is also highly advantageous to have the coacting parts held yieldingly in engagement, as by the spring washer 18 in the construction illustrated.

In the case of the rear spring and axle of the vehicle, the shock absorber itself is the same in construction as that above described in connection with the front spring and axle of the vehicle. However, the connecting devices for securing the shock absorbers to the rear frame and axle parts differ from those above described and, in addition, the shock absorber is inverted and also turned 90° about its longitudinal axis so that the plane of the friction plate 1 is disposed longitudinally of the vehicle rather than transversely of it as in the case of the shock absorbers at the front of the vehicle. One of the rear shock absorbers is shown in Figs. 2 to 5, inclusive.

Referring to Fig. 2, it will be seen that the semi-spherical socket 2ᶠ of the shock absorber casing is secured by a bolt to the downwardly turned apertured end of a clamp yoke 27 which is secured to the tubular rear axle *c* of the vehicle by the U-bolt 28 and nuts 29. The apertured end of the yoke 27 is formed with a semi-spherical countersink 27ᵃ to engage the socket 2ᶠ and the bolt 26 is formed with a semi-spherical head for the same purpose, and the bolt is secured by a nut 30 and spring washer 31 as in the connections previously described.

In this case the semi-spherical socket 1ᵃ of the friction plate 1 is secured to the transverse channel member *d* of the vehicle frame by means of a clamp consisting of a forging 32, a plate 33 and a bolt 34. The forging 32 is formed with a flange 32ᵃ which overlies the channel member of the vehicle frame and prevents displacement of the clamp when the bolt is tightened up. The member 32 is formed with a rearwardly turned flange or lug 32ᵇ which has an aperture with a semi-spherical countersink 32ᶜ to fit the semi-spherical socket 1ᵃ of the friction plate 1 and said plate is secured to the lug 32ᵇ by a bolt 35 having a semi-spherical head 35ᵃ and fitted with a nut 36 and spring washer 37 as in the case of the other connections. In the case of all of the pivotal joints formed by the bolts with spherical heads, the securing nuts of said bolts are preferably locked with cotter pins, as indicated.

Figs. 4 and 5 show the yoke plate 27 in two different positions of adjustment to correspond with different loads of the vehicle springs which result in different normal clearances between the rear axle and the chassis frame. For example, in the case of Ford chassis used for commercial purposes bodies varying considerably in weight are employed for different purposes and as the same springs are commonly used for all purposes, the clearance between the rear axle and chassis frame varies, as stated. With the plane of the shock absorber friction plate disposed longitudinally of the vehicle and with my improved pivotal connections between the shock absorber parts and the axle and vehicle frame, respectively, it is possible to accommodate the shock absorber to these different operating conditions by simply loosening the nuts 29 and adjusting the clamp yoke 27 angularly on the tubular axle *c*. By such adjustments the friction plate 1 can always be given substantially the same position of adjustment in relation to the casing 2 when the vehicle is unloaded.

In addition to the advantage above noted, by disposing the plane of the friction plate 1 longitudinally of the vehicle it has the further advantage of slight ground resistance in case the lower end of the plate 1 engages the ground when the springs are abnormally compressed in traversing extremely rough roads or when the wheels of the vehicle drop into extremely deep ruts. In the case of such abnormal engagement of plate 1 with the road little resistance is offered to the plate because of its edgewise engagement and, furthermore, the friction plate is disposed to the best advantage for withstanding such stresses as do result from the road engagement. It will be seen, of course, that the adjustable mounting of the clamp yoke 27 makes it possible, by using friction plate 1 of suitable length, to insure a maximum road clearance for all loading conditions.

It will be seen that my improved pivotal connections between the shock absorber and the vehicle parts are in the nature of ball-and-socket fittings and afford universal movement of the connected parts sufficient in extent to fully accommodate all of the relative movements that occur between the vehicle axles and chassis frame. At the same time my improved universal connections are exceedingly simple structurally and capable of being produced at very low expense, the ball-and-socket parts being formed to a considerable extent by pressing or stamping operations and machining operations being limited to the clamping plates or yokes 14, 19, 27 and 32, and to the heads of the bolts 16, 23, 26, and 35.

While the specific forms of construction illustrated and above described are such as I prefer it is to be understood that the construction can be varied without departing from the invention, as defined by the appended claims.

What I claim is:

1. In a shock absorber adapted to be interposed between an axle and the spring-suspended body of a vehicle, the combination of a pair of relatively movable coacting resistance parts and means for connecting said resistance parts to the vehicle axle and body, respectively, each of said connecting means comprising a perforated concavo-convex socket formed in the resistance part, a perforated member formed with a countersink fitting the convex side of said socket, a bolt extending through said perforated member and loosely through the perforation of the socket and having a spherical head fitting the concave side of said socket, and means operatively engaging the said perforated member and bolt for holding the countersink, socket and bolt head in operative contact, one of the parts other than the resistance member being adapted to be secured to one of the vehicle parts.

2. In a shock absorber adapted to be interposed between an axle and the spring-suspended body of a vehicle, the combination of a pair of relatively movable coacting resistance parts, one of said parts comprising a wrought plate metal member, and means for connecting said resistance parts to the vehicle axle and body, respectively, the connecting means for the plate metal member comprising a perforated concavo-convex socket pressed in said member, a perforated member formed with a countersink fitting the convex side of said socket, a bolt extending through said perforated member and loosely through the perforation of the socket and having a spherical head fitting the concave side of said socket, and means operatively engaging the said perforated member and bolt for holding the countersink, socket and bolt head in operative contact, one of the parts of the said connecting means other than the plate metal member being adapted to be secured to one of the vehicle parts.

3. In a shock absorber adapted to be interposed between an axle and the spring-suspended body of a vehicle, the combination of a pair of relatively movable coacting resistance parts and means for connecting said resistance parts to the vehicle axle and body, respectively, each of said connecting means comprising a perforated concavo-convex socket formed in the resistance part, a perforated member formed with a countersink fitting the convex side of the socket, a bolt extending through said perforated member and loosely through the perforation of the socket and having a spherical head fitting the concave side of said socket, and adjustable means for holding the countersink, socket and bolt head in operative contact, one of the parts other than the resistance member being adapted to be secured to one of the vehicle parts.

4. In a shock absorber adapted to be interposed between an axle and the spring-suspended body of a vehicle, the combination of a pair of relatively movable coacting resistance parts, one of said parts comprising a wrought plate metal member, and means for connecting said resistance parts to the vehicle axle and body, respectively, the connecting means for the plate metal member comprising a perforated concavo-convex socket pressed in said member, a perforated member formed with a counter-sink fitting the convex side of said socket, a bolt extending through said perforated member and loosely through the perforation of the socket and having a spherical head fitting the concave side of said socket, and adjustable means for holding the countersink, socket and bolt head in operative contact, one of the parts of the said connecting means other than the plate metal member being adapted to be secured to one of the vehicle parts.

5. In a shock absorber adapted to be interposed between an axle and the spring-suspended body of a vehicle, the combination of a pair of relatively movable coacting resistance parts and means for connecting said resistance parts to the vehicle axle and body, respectively, each of said connecting means comprising a perforated concavo-convex socket formed in the resistance part, a perforated member formed with a countersink to fit the convex side of said socket, a bolt extending through said perforated member and having a spherical head fitting the concave side of said socket one of the parts of said connecting means other than the resistance part being adapted to be secured to one of the vehicle parts, and means for yieldingly holding the countersink, socket and bolt head in operative contact.

6. In a shock absorber adapted to be interposed between an axle and the spring-suspended body of a vehicle, the combination of a pair of relatively movable coacting resistance parts and means for connecting said resistance parts to the vehicle axle and body, respectively, each of said connecting means comprising a perforated concavo-convex socket formed in the resistance part, a clamp member adapted to be secured to one of the vehicle parts and formed with a countersink to fit the convex side of said socket, and a bolt extending through said clamp member and loosely through the perforation of the socket and having a spherical head fitting the concave side of said socket.

7. In a shock absorber adapted to be interposed between an axle and the spring-suspended body of a vehicle, the combination of a pair of relatively movable coacting resistance parts, one of said parts comprising a wrought plate metal member, and means for connecting said resistance parts to the vehicle axle and body, respectively, the connecting means for the plate metal member comprising a perforated concavo-convex socket pressed in said member, a clamp member adapted to be secured to one of the vehicle parts and formed with a countersink to fit the convex side of said socket, and a bolt extending through said clamp member and loosely through the perforation of the socket and having a spherical head fitting the concave side of said socket.

8. In a shock absorber adapted to be interposed between an axle and the spring-suspended body of a vehicle, the combination of a pair of relatively movable coacting resistance parts and means for connecting resistance parts and means for connecting said resistance parts to the vehicle axle and body, respectively, each of said connecting means comprising a perforated concavo-convex socket formed in the resistance part, a clamp member adapted to be secured to one of the vehicle parts and formed with a countersink to fit the convex side of said socket, a bolt extending through said clamp member and loosely through the perforation of the socket and having a spherical head fitting the concave side of said socket, and means for yieldingly holding the countersink, socket and bolt head in operative contact.

9. In a shock absorber adapted to be interposed between an axle and the spring-suspended body of a vehicle, the combination of a pair of relatively movable coacting resistance parts, one of said parts comprising a wrought plate metal member, and means for connecting said resistance parts to the vehicle axle and body, respectively, the connecting means for the plate metal member comprising a perforated socket pressed in said member, a perforated member formed with a countersink to fit the outer side of said socket, a bolt extending through said perforated member and loosely through the perforation of the socket and having a head fitting the inner side of said socket, and means for yieldingly holding the countersink, socket and bolt head in operative contact, one of the parts of the said connecting means other than the plate metal member being adapted to be secured to one of the vehicle parts.

10. In a shock absorber adapted to be interposed between an axle and the spring-suspended body of a vehicle, the combination of a pair of relatively movable coacting resistance parts, each of said parts comprising a wrought plate metal member, and means for connecting said resistance parts to the vehicle axle and body, respectively, comprising in the case of each of said parts a perforated socket pressed in the wrought plate metal member, a perforated member formed with a countersink to fit the outer side of said socket, a bolt extending through said perforated member and loosely through the perforation of the socket and having a head fitting the inner side of said socket, and means for yieldingly holding the countersink, socket and bolt head in operative contact, one of the parts of the said connecting means other than the plate metal member being adapted to be secured to one of the vehicle parts.

11. In a shock absorber adapted to be interposed between an axle and the spring-suspended body of a vehicle, the combination of a pair of relatively movable coacting resistance parts, one of said parts comprising a wrought plate metal member, and means for connecting said resistance parts to the vehicle axle and body, respectively, the connecting means for the plate metal member comprising a perforated concavo-convex socket pressed in said member, a perforated member formed with a countersink to fit the outer side of said socket, a bolt extending through said perforated member and loosely through the perforation of the socket and having a head fitting the inner side of said socket, and adjustable means for holding the countersink, socket and bolt head in operative contact, one of the parts of the said connecting means other than the plate metal member being adapted to be secured to one of the vehicle parts.

12. In a shock absorber adapted to be interposed between an axle and the spring-suspended body of a vehicle, the combination of a pair of relatively movable coacting resistance parts, each of said parts comprising a wrought plate metal member, and means for connecting said resistance parts to the vehicle axle and body, respectively, comprising in the case of each of said parts a perforated socket pressed in the wrought plate metal member, a perforated member formed with a countersink to fit the outer side of said socket, a bolt extending through said perforated member and loosely through the perforation of the socket and having a head fitting the inner side of said socket, and adjustable means for holding the countersink, socket and bolt head in operative contact, one of the parts of the said connecting means other than the plate metal member being adapted to be secured to one of the vehicle parts.

13. In a shock absorber adapted to be interposed between an axle and the spring-suspended body of a vehicle, the combination of a pair of elongated friction members having mutual telescoping engagement, means for pivotally connecting the upper end of one of said members to the vehicle body, means for pivotally connecting the lower end of the other friction member to the vehicle axle, said pivotal connecting means being adapted to permit swinging of the friction members relative to the vehicle body and axle both transversely and longitudinally of the vehicle and the second named pivotal connecting means being adjustable to raise and lower its friction member relative to the axle.

14. In a shock absorber adapted to be interposed between an axle and the spring-suspended body of a vehicle, the combination of a pair of elongated friction members having mutual telescoping engagement, means for pivotally connecting the upper end of one of said members to the vehicle body, and means comprising a clamp surrounding the vehicle axle for pivotally connecting the lower end of the other friction member to said axle, said pivotal connecting means being adapted to permit swinging of the friction members relative to the vehicle body and axle both transversely and longitudinally of the vehicle and the said clamp being adjustable about the axis of the axle to raise and lower its friction member relative to the axle.

15. In a shock absorber adapted to be interposed between an axle and the spring-suspended body of a vehicle, the combination of an elongated friction plate, means for pivotally connecting the upper end of said plate to the vehicle body with the plane of the plate parallel to the longitudinal axis of the vehicle, a casing through which said plate extends telescopically and which contains friction facings to engage the plate, and means comprising a clamp surrounding the vehicle axle for pivotally connecting the lower end of said casing to said axle, said pivotal connecting means being adapted to permit swinging of the friction plate and the casing relative to the vehicle frame and axle both transversely and longitudinally of of the vehicle and the said clamp being adjustable about the axis of the axle to raise and lower the casing relative to the axle.

In testimony whereof, I hereunto affix my signature.

SAMUEL K. WELLMAN.